(12) United States Patent
Chuang

(10) Patent No.: US 9,467,004 B2
(45) Date of Patent: Oct. 11, 2016

(54) WIRELESS CHARGING CIRCUIT FOR POWER BANK AND POWER BANK THEREOF

(71) Applicant: Generalplus Technology Inc., Hsinchu (TW)

(72) Inventor: Down Xu Chuang, Zhunan Township, Miaoli County (TW)

(73) Assignee: GENERALPLUS TECHNOLOGY INC., Hsinchu (TW)

( * ) Notice: Subject to any disclaimer, the term of this patent is extended or adjusted under 35 U.S.C. 154(b) by 228 days.

(21) Appl. No.: 14/478,261

(22) Filed: Sep. 5, 2014

(65) Prior Publication Data

US 2015/0188355 A1    Jul. 2, 2015

(30) Foreign Application Priority Data

Dec. 27, 2013    (TW) .............................. 102148710 A

(51) Int. Cl.
*H02J 7/00* (2006.01)
*H01F 38/00* (2006.01)
*H02J 7/02* (2016.01)
*H02J 5/00* (2016.01)

(52) U.S. Cl.
CPC .............. *H02J 7/025* (2013.01); *H02J 7/0052* (2013.01); *H02J 5/005* (2013.01); *H02J 2007/0059* (2013.01)

(58) Field of Classification Search
CPC ........ H02J 7/025; H02J 7/0052; H02J 5/005; H02J 2007/0059
USPC ........................... 320/108, 137; 307/104, 150
See application file for complete search history.

(56) References Cited

U.S. PATENT DOCUMENTS

| | | | | |
|---|---|---|---|---|
| 5,793,123 A * | 8/1998 | Ho | .......................... | H02J 9/061 307/64 |
| 8,441,154 B2 * | 5/2013 | Karalis | ..................... | H03H 7/40 307/104 |
| 8,476,865 B2 * | 7/2013 | Iwanaga | ................ | B60K 6/445 180/65.21 |
| 8,847,555 B2 * | 9/2014 | Loudot | ............... | B60L 11/1814 320/137 |
| 8,901,778 B2 * | 12/2014 | Kesler | ....................... | H03H 7/40 307/104 |
| 8,912,687 B2 * | 12/2014 | Kesler | ................... | B60L 11/182 307/10.1 |
| 2015/0050881 A1 * | 2/2015 | Chen | ................. | H04W 52/0296 455/41.1 |

* cited by examiner

*Primary Examiner* — M'Baye Diao
(74) *Attorney, Agent, or Firm* — Muncy, Geissler, Olds & Lowe, P.C.

(57) ABSTRACT

A wireless charging circuit for power bank and a power bank thereof are provided in the present invention. The wireless charging circuit includes a boost DC to DC converter, a unidirectional conductive element and a wireless power converter. The input terminal of the boost DC to DC converter is coupled to the battery to receive the battery voltage. The output terminal of the boost DC to DC converter outputs a converted DC voltage. The first terminal of the unidirectional conductive element is coupled to the battery to receive the battery voltage. The input terminal of the wireless power converter is coupled to the second terminal of the unidirectional conductive element. When the wireless charging circuit performs the detection for the wireless power receiver, the wireless power converter disables the boost DC to DC converter.

34 Claims, 12 Drawing Sheets

WIRELESS CHARGING CIRCUIT FOR POWER BANK AND POWER BANK THEREOF

This application claims priority of No. 102148710 filed in Taiwan R.O.C. on Dec. 27, 2013 under 35 USC 119, the entire content of which is hereby incorporated by reference.

BACKGROUND OF THE INVENTION

1. Field of Invention

The present invention relates to the wireless power transmission and feedback technology, and more particularly to a wireless charging circuit adapted for a mobile power bank and a mobile power bank using the same.

2. Related Art

Wireless charging technology is a technology for charging device by electromagnetic field without any wire. Wireless charging technology is evolved from the wireless power transmission technology to use the magnetic resonant to transmit the electrical charge from charger to device to resonate coil and capacitor between the charge and device to achieve a high efficient power transmission. The wireless charger is more safer, no exposed connections, no leakage current. Thus, a lot of problems in wired charger is prevented.

Due to the development of the wireless charging technology, Wireless Power Consortium is established because of the situation. One of accomplishments of Wireless Power Consortium is to promote Qi standard. With the standardization, wireless charging technology is more widely adopted.

Additionally, since the mobile power bank is widely used, many manufacturers want to launch a product combining the wireless charging circuit and mobile power bank. The mobile power bank adopts the battery to be the main power source. Generally, the battery supplies 3.7V. However, the wireless charging circuit needs 5V input voltage to operate. Thus, between the wireless charging circuit and the battery, it must design a DC to DC converter. FIG. 1 illustrates a circuit diagram depicting a wireless charging circuit according to a conventional art. Referring to FIG. 1, in this circuit diagram, a boost DC to DC converter 103 is implemented between the battery 101 and the wireless charging circuit 102. When the wireless charging circuit 102 detects whether a wireless power receiver is disposed on the wireless charging circuit 102 or not, the boost DC to DC converter 103 must be enabled so that the detection can be performed. Thus, if an external object is disposed on the wireless charging circuit, the boost DC to DC converter 103 would be enabled. It causes the conversion loss and then the usage time of the power bank is decreased.

SUMMARY OF THE INVENTION

It is therefore an objective of the present invention to provide a wireless charging circuit adapted for a mobile power bank and a mobile power bank using the same such that the power consumption from the detection of the external object can be reduced and the life time of the power bank can be extended.

To achieve the above-identified or other objectives, the present invention provides wireless charging circuit, which is adapted for a power bank, wherein the power bank includes a battery. The wireless charging circuit includes a boost DC to DC converter, a unidirectional conductive element, and a wireless power converter. The boost DC to DC converter includes an input terminal and an output terminal, wherein the input terminal of the boost DC to DC converter is coupled to the battery to receive a battery voltage, wherein the output terminal of the boost DC to DC converter is for outputting a converted DC voltage. The unidirectional conductive element includes a first terminal and a second terminal, wherein the first terminal of the unidirectional conductive element is coupled to the battery to receive the battery voltage, wherein a current direction is from the first terminal of the unidirectional conductive element to the second terminal of the unidirectional conductive element. The wireless power converter is coupled to the second terminal of the unidirectional conductive element and the output terminal of the boost DC to DC converter. When the wireless charging circuit determines whether an external object is disposed on the wireless power converter or not, the wireless power converter disables the boost DC to DC converter. When the wireless charging circuit determines that an external object is disposed on the wireless power converter, the wireless power converter enables the boost DC to DC converter.

In the wireless charging circuit according to the preferred embodiment of the present invention, the wireless power converter includes a low voltage pulse width modulation (PWM) circuit, a resonant circuit and a control circuit. The low voltage PWM circuit includes an input terminal and an output terminal, wherein the input terminal of the low voltage PWM circuit is coupled to the second terminal of the unidirectional conductive element, and the output terminal of the low voltage PWM circuit outputs a PWM detecting signal. The resonant circuit includes a first input terminal, wherein the first input terminal is coupled to the output terminal of the low voltage PWM circuit. The control circuit is coupled to the enable terminal of the boost DC to DC converter. When the wireless charging circuit determines whether an external object is disposed on the wireless power converter or not, the control circuit controls the boost DC to DC converter to disable the boost DC to DC converter. Furthermore, in a preferred embodiment, the low power PWM circuit includes a first upper switch and a first lower switch, wherein the first upper switch and the first lower switch is composed of a half bridge converter controlled by the battery voltage.

In the wireless charging circuit according to the preferred embodiment of the present invention, the wireless power converter further includes a high voltage pulse width modulation (PWM) circuit and a driving circuit. The high voltage PWM circuit is coupled to the output terminal of the boost DC to DC converter for outputting a driving PWM signal to the resonant circuit. The driving circuit is coupled to the high voltage pulse width modulation circuit, the boost DC to DC converter and the control circuit. When the wireless charging circuit determines that an external object is disposed on the wireless power converter, the control circuit enables the boost DC to DC converter and the control circuit enables the driving circuit to drive the high voltage PWM circuit.

In the wireless charging circuit according to the preferred embodiment of the present invention, the high voltage PWM circuit includes a second upper switch and a second lower switch. The control terminal of the second upper switch is coupled to the driving circuit, and the first terminal of the second upper switch is coupled to the output terminal of the boost DC to DC converter. The control terminal of the second lower switch is coupled to the driving circuit, the first terminal of the second lower switch is coupled to the second terminal of the second upper switch and the first input terminal of the resonant circuit, and the second terminal of the second lower switch is coupled to a common voltage. In another preferred embodiment, the high voltage PWM circuit is a full bridge converter, and the resonant circuit further includes a second input terminal. Thus, the high voltage PWM circuit further includes a third upper switch and a third lower switch. The control terminal of the third upper switch is coupled to the driving circuit, and the first terminal of the third upper switch is coupled to the output terminal of the boost DC to DC converter. The control terminal of the third lower switch is coupled to the driving circuit, the first terminal of the third lower switch is coupled to the second terminal of the third upper switch and the second input terminal of the resonant circuit, and the second terminal of the third lower switch is coupled to the common voltage. Further, when the high voltage PWM circuit is the full bridge converter, the wireless charging circuit further includes a detection switch. The control terminal of the detection switch is coupled to the control circuit, the first terminal of the detection switch is coupled to the second input terminal of the resonant circuit, and the second terminal of the detection switch is coupled to the common voltage. When the wireless charging circuit determines whether an external object is disposed on the wireless power converter or not, the control circuit controls to connect the first terminal of the detection switch and the second terminal of the detection switch.

The present invention further provides a mobile power bank. The mobile power bank includes a battery and a wireless charging circuit. The wireless charging circuit includes a boost DC to DC converter, a unidirectional conductive element and a wireless power converter. The boost DC to DC converter includes an input terminal and an output terminal, wherein the input terminal of the boost DC to DC converter is coupled to the battery to receive a battery voltage, wherein the output terminal of the boost DC to DC converter is for outputting a converted DC voltage. The unidirectional conductive element includes a first terminal and a second terminal, wherein the first terminal of the unidirectional conductive element is coupled to the battery to receive the battery voltage, wherein a current direction is from the first terminal of the unidirectional conductive element to the second terminal of the unidirectional conductive element. The wireless power converter is coupled to the second terminal of the unidirectional conductive element and the output terminal of the boost DC to DC converter.

When the wireless charging circuit determines whether an external object is disposed on the wireless power converter or not, the wireless power converter disables the boost DC to DC converter. When the wireless charging circuit determines that an external object is disposed on the wireless power converter, the wireless power converter enables the boost DC to DC converter.

The spirit of the present invention is to disable the DC to DC converter when the wireless charging circuit determines whether an external object is disposed on the wireless power converter or not. Instead, when the wireless charging circuit determines whether an external object is disposed on the wireless power converter or not, the battery voltage is supplied to the wireless charging circuit without conversion to perform the detection of external object. When the wireless charging circuit determines that an external object is disposed on the wireless power converter, the wireless power converter enables the boost DC to DC converter. Thus, when the detection of an external object is performed, there is no extra power consumption from the DC to DC converter. Meanwhile, the power consumption of the detection of an external wireless power receiver can be also reduced.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE INVENTION

The present invention will be apparent from the following detailed description, which proceeds with reference to the accompanying drawings, wherein the same references relate to the same elements.

Figure 1:
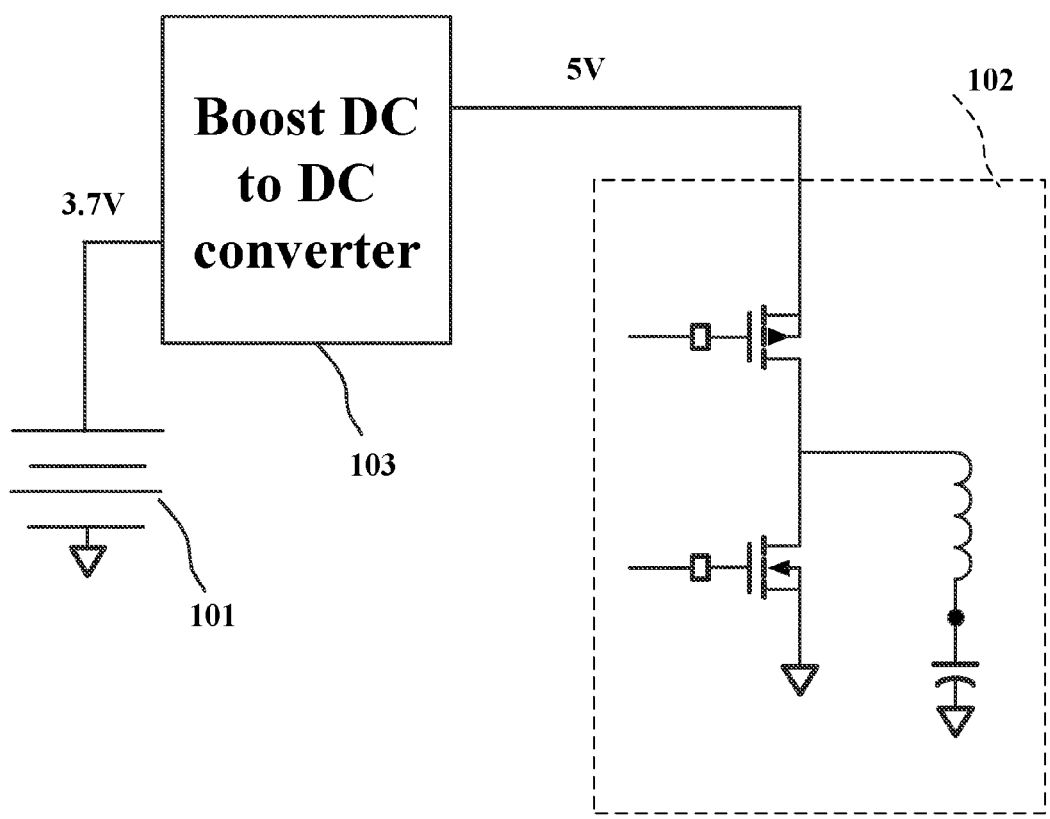
FIG. 1 illustrates a circuit diagram depicting a wireless charging circuit according to a conventional art.
Figure 2:
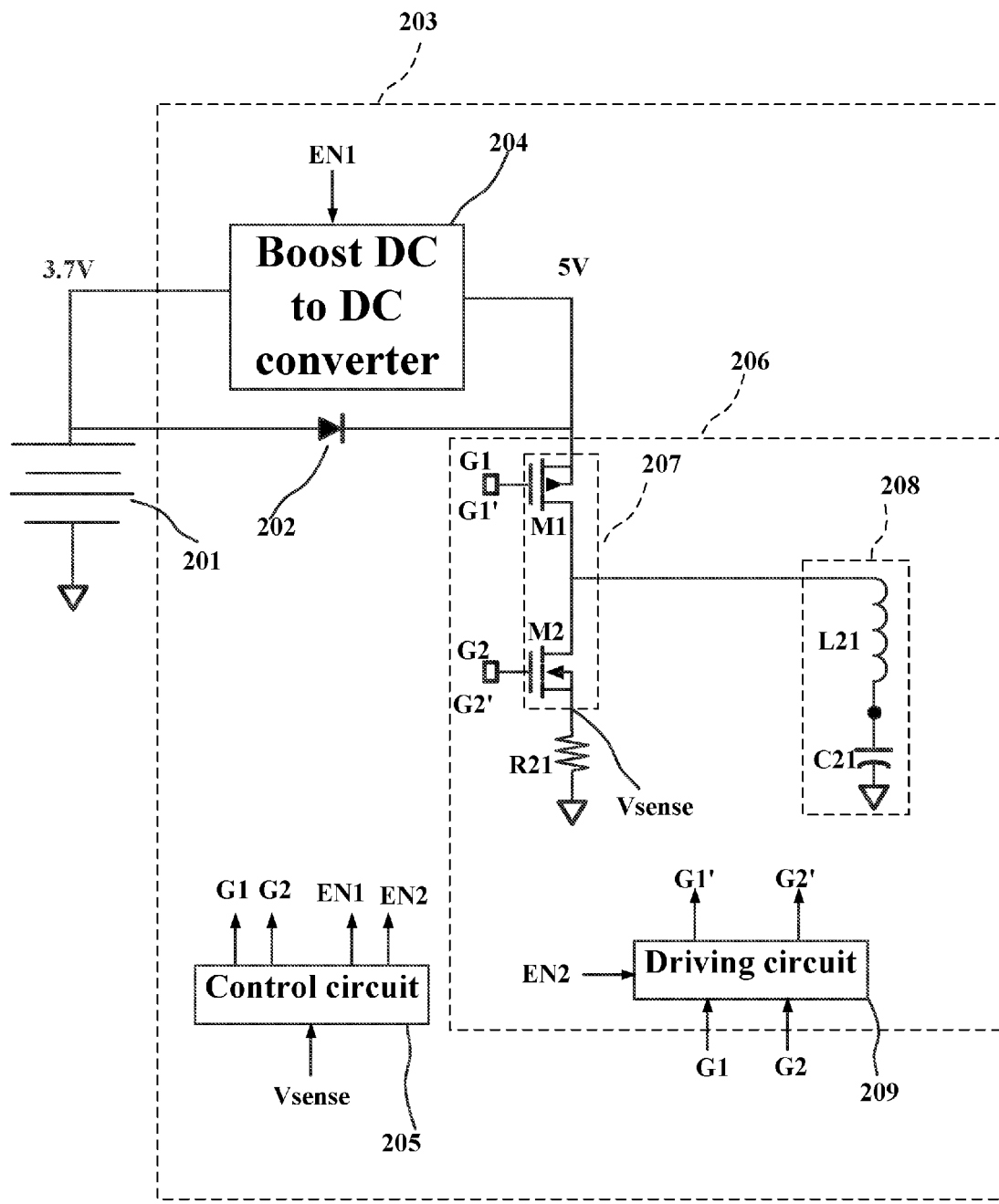
FIG. 2 illustrates a circuit diagram depicting a mobile power bank according to a preferred embodiment of the present invention.

FIG. 2 illustrates a circuit diagram depicting a mobile power bank according to a preferred embodiment of the present invention. Referring to FIG. 2, the mobile power bank includes a battery 201, a unidirectional conductive element 202 and a wireless charging circuit 203 of the present embodiment of the present invention. The wireless charging circuit 203 includes a boost DC to DC converter 204, a control circuit 205 and a wireless power converter 206. The boost DC to DC converter 204 is used for converting 3.7V supplied from the battery 201 to 5V which is required by the wireless power converter 206. The wireless power converter 206 includes a half bridge converter 207, a resonant circuit 208 and a driving circuit 209. The half bridge converter 207 includes a upper switch M1 and a lower switch M2.

The operation of the control circuit 205 depends on the 3.7V supplied by the battery 201. The operation of the driving circuit 209 depends on the 5V outputted from by the boost DC to DC converter 204. In addition, the control circuit 205 is used for controlling whether the boost DC to DC converter 204 is enabled or not. Moreover, although the resonant circuit 208 is implemented by a resonant coil L21 and a resonant capacitor C21, people having ordinary skill in the art should know that the number of the resonant coil L21 and the resonant capacitor C21 can be changed according to different design, and the coupling relationship of the resonant coil L21 and the resonant capacitor C21 can be changed, such as interchanging the resonant coil L21 with the resonant capacitor C21. Thus, the present invention is not limited thereto.

When the wireless charging circuit 203 begins to detect a wireless power receiver (or an external object), the boost DC to DC converter 204 and the driving circuit 209 is disabled. Instead, the control circuit 205 directly outputs the control signals G1 and G2 to control the gates of the switch elements M1 and M2 of the half bridge converter 207 to output a low voltage pulse width modulation (PWM) signal, whose amplitude is about 3.7V, to the resonant circuit 208. Then, the control circuit 205 begins to detect the current of the resonant circuit 208. Generally, the control circuit 205 would detect the voltage Vsense from the current sensing resistor R21 to serve as the means for detecting the current of the resonant circuit 208. When the current flowing through the current sensing resistor R21 is increased, it represent that there is an object being disposed on the resonant coil L21. At this time, the control circuit 205 enables the boost DC to DC converter 204, and controls the driving circuit 209 to drive the half bridge converter with 5V to output a high voltage PWM signal whose amplitude is about 5V, to attempt establishing a wireless connection with the object.

Further, in order to prevent the 5V outputted from the boost DC to DC converter 204 returning to the battery 201, in the abovementioned embodiment, the unidirectional conductive element 202 is coupled between the battery 201 and the output terminal of the boost DC to DC converter 204. Thus, the 5V outputted from the boost DC to DC converter 204 would not feed back to the battery 201. In the abovementioned embodiment, since the amplitude of the control signal outputted from the control circuit 205 is about 3.7V, the control signal is insufficient to drive the gate of the upper switch M1 if the boost DC to DC converter 204 is enabled. Thus, the driving circuit 209 is with a function of level shift for converting the 3.7V amplitude of the driving signal to the 5V amplitude of the driving signal. In addition, the terminals of the control circuit 205 and the terminals of the driving circuit 209 are coupled to the half bridge converter 207. In order to prevent the driving signal outputted from the driving circuit 209 to interfere the operation of the control circuit 205, a resistor or a diode can be selectively coupled between the control circuit 205 and the gates of the switching elements M1 and M2 of the half bridge converter 207.

Moreover, although the unidirectional conductive element 202 in this embodiment is implemented by a diode, people having ordinary skill in the art should know that the unidirectional conductive element 202 also can be implemented by a electrical switch or a diode-connected transistor. Thus, the present invention is not limited thereto.

Figure 3:
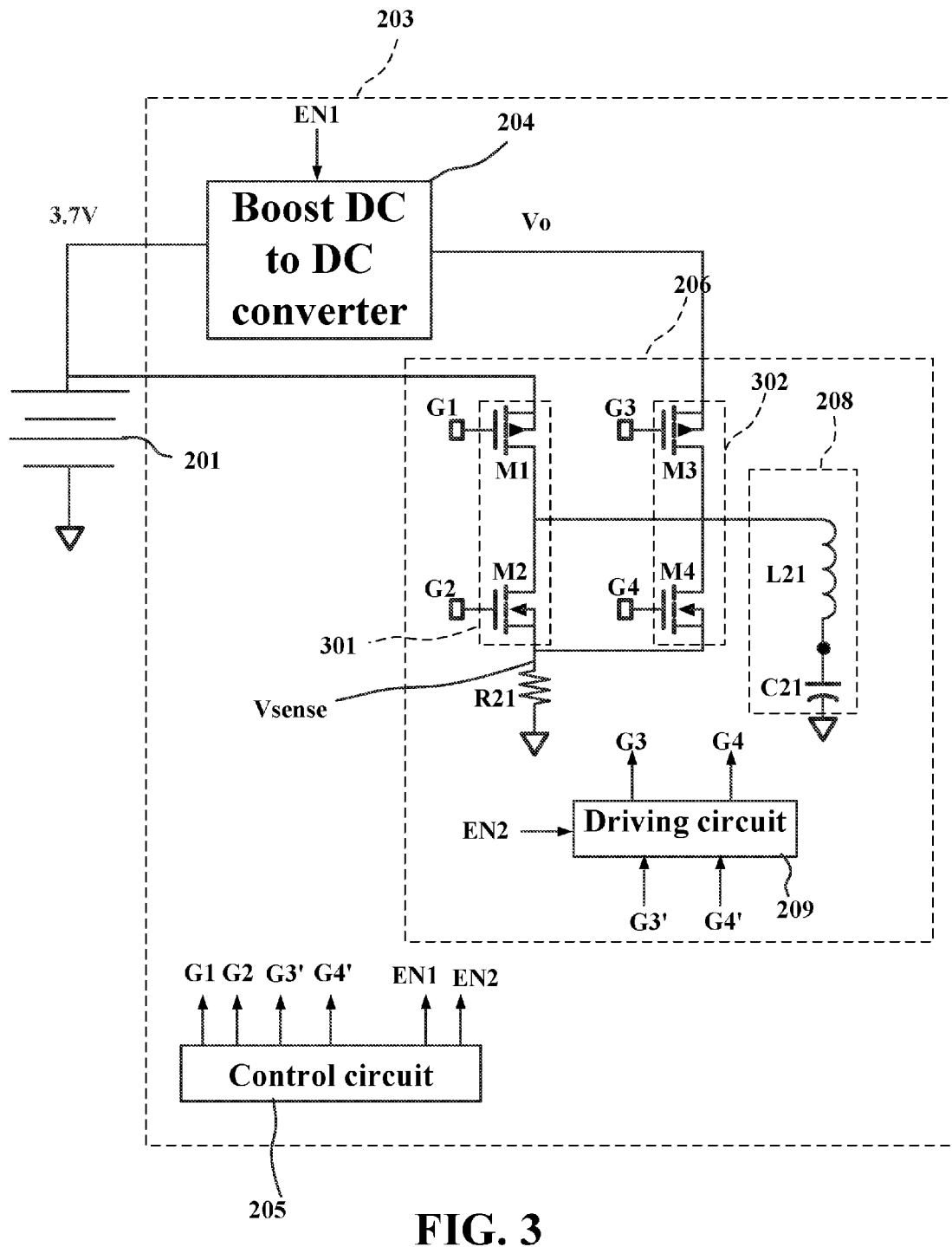
FIG. 3 illustrates a circuit diagram depicting a mobile power bank according to a preferred embodiment of the present invention.

FIG. 3 illustrates a circuit diagram depicting a mobile power bank according to a preferred embodiment of the present invention. Referring to FIG. 2 and FIG. 3, in this embodiment, the wireless charging circuit 203 includes the boost DC to DC converter 204, a control circuit 205 and the wireless power converter 206. The wireless power converter 206 includes a first half bridge converter 301, the resonant circuit 208, the driving circuit 209 and a second half bridge converter 302. The first half bridge converter 301 includes a upper switch M1 and a lower switch M2. The second half bridge converter 302 includes an upper switch M3 and a lower switch M4.

Similarly, the operation of the control circuit 205 depends on the 3.7V supplied by the battery 201. The operation of the driving circuit 209 depends on the 5V outputted from by the boost DC to DC converter 204. In addition, the control circuit 205 is used for controlling whether the boost DC to DC converter 204 is enabled or not. Moreover, although the resonant circuit 208 is implemented by a resonant coil L21 and a resonant capacitor C21, people having ordinary skill in the art should know that the number of the resonant coil L21 and the resonant capacitor C21 can be changed according to different design, and the coupling relationship of the resonant coil L21 and the resonant capacitor C21 can be changed, such as interchanging the resonant coil L21 with the resonant capacitor C21. Thus, the present invention is not limited thereto.

In this embodiment, a low voltage pulse width modulation circuit, which is the half bridge converter 301, is used to replace the unidirectional conductive element 202. When the wireless charging circuit 203 begins to detect the wireless power receiver (or an external object), the boost DC to DC converter 204, the driving circuit 209 and the second half bridge converter 302 are disabled. Instead, the control circuit 205 controls the first half bridge converter 301 to output a low voltage PWM signal, whose amplitude is about 3.7V, to the resonant circuit 208. The control circuit then starts to detect the current flowing through the resonant circuit 208. Generally, the control circuit 205 would detect the voltage Vsense from the current sensing resistor R21 to serve as the means for detecting the current of the resonant circuit 208. When the current flowing through the current sensing resistor R21 is increased, it represent that there is an object being disposed on the resonant coil L21. At this time, the control circuit 205 enables the boost DC to DC converter 204, and controls the driving circuit 209 to drive the half bridge converter with 5V to output a high voltage PWM signal whose amplitude is about 5V, to attempt establishing the connection with the object.

According to the abovementioned embodiment, people having ordinary skill in the art should know that the boost DC to DC converter 204 is disabled during the wireless charging circuit detecting an external object. Thus, the energy waste causing by the efficiency of the boost DC to DC converter 204 can be saved. Beside, when the boost DC to DC converter 204 starts to operate, since the upper switch M1 of the first half bridge converter 301 is coupled to the battery voltage and the upper switch M3 of the second half bridge converter 302 is coupled to 5V outputted from the boost DC to DC converter 204, the operation of the first half bridge converter 301 and the operation of the second half bridge converter 302 would not interfere each others. Also, the 5V outputted from the boost DC to DC converter 204 will not feed back to the battery 201.

Figure 4:
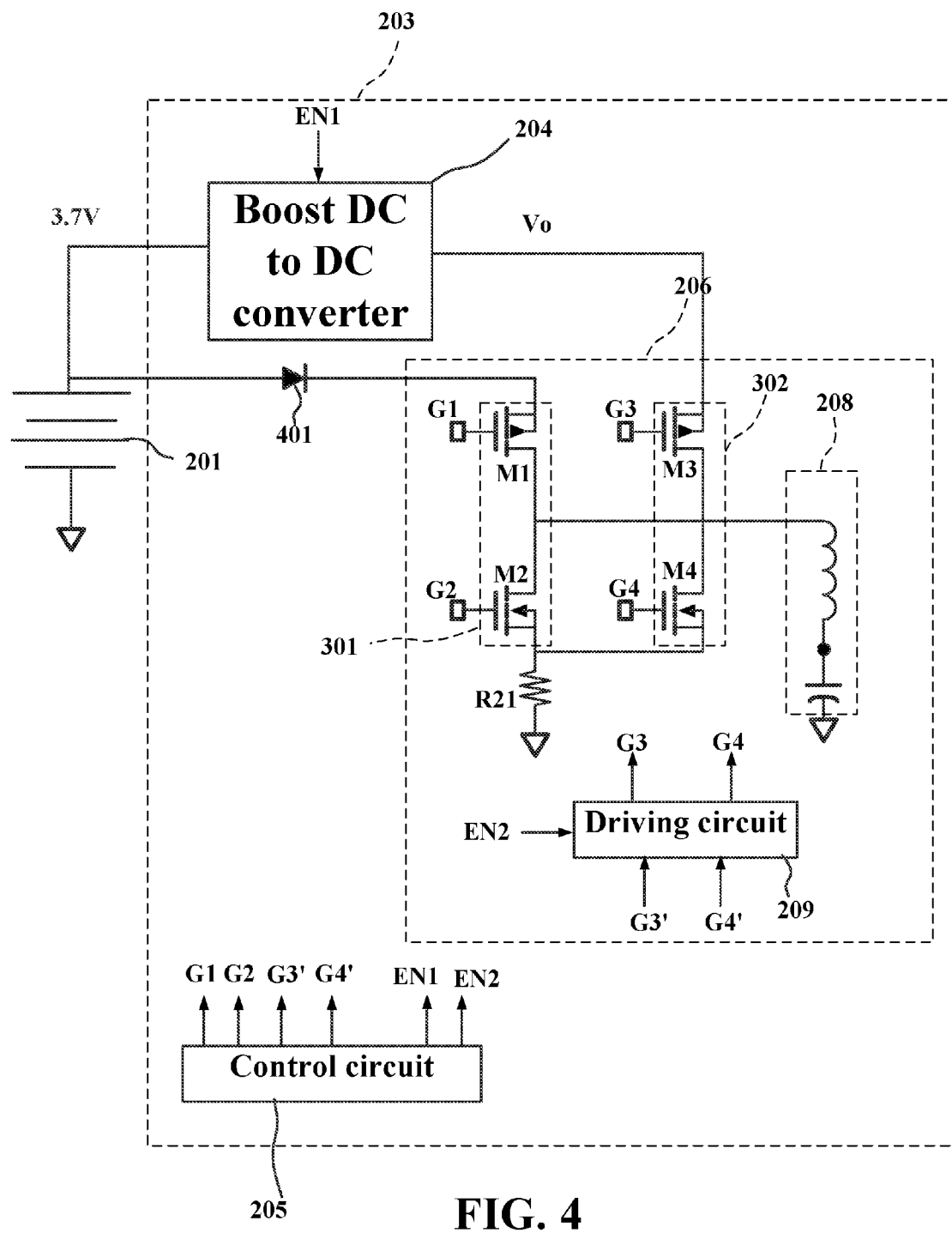
FIG. 4 illustrates a circuit diagram depicting a mobile power bank according to a preferred embodiment of the present invention.
Figure 5:
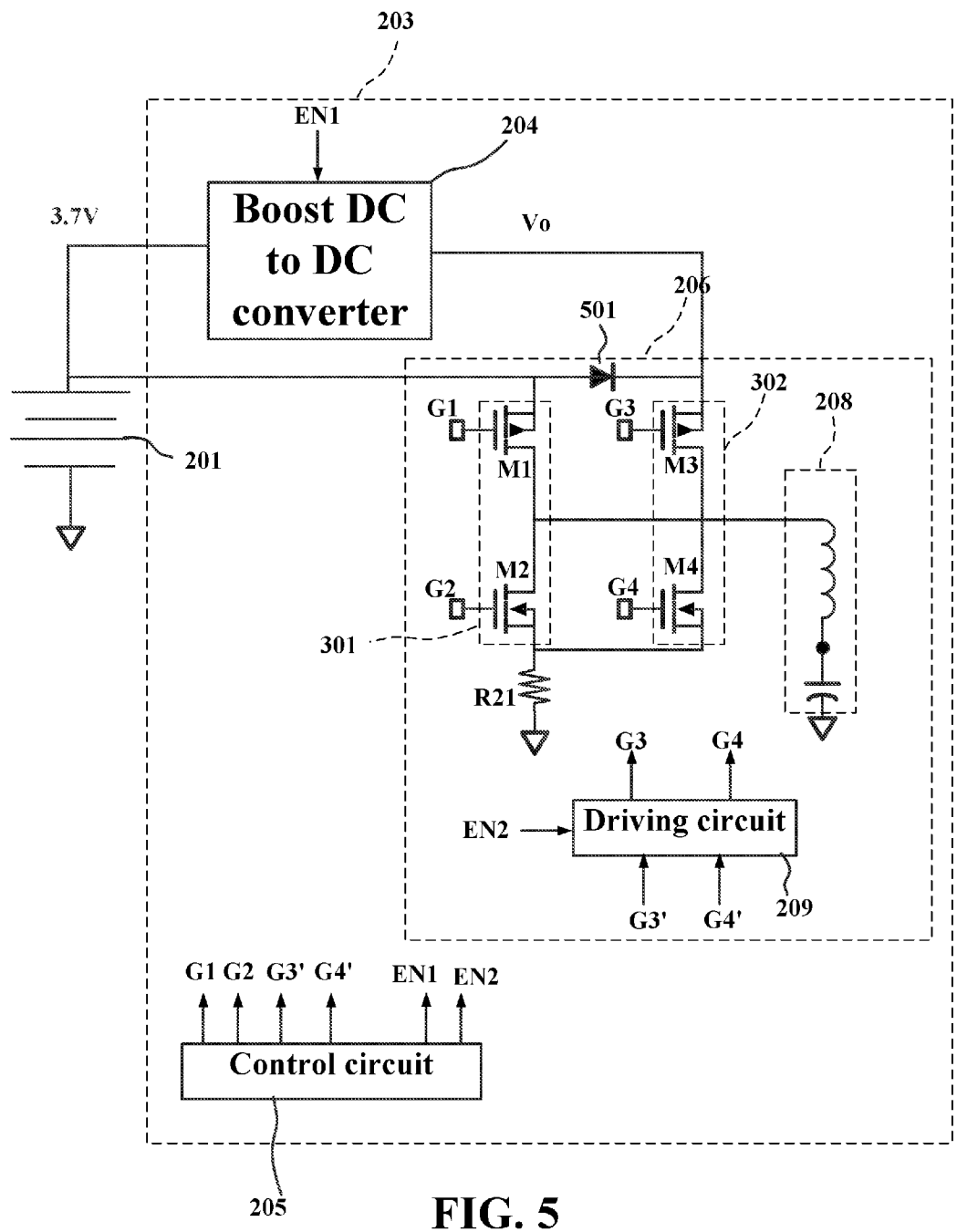
FIG. 5 illustrates a circuit diagram depicting a mobile power bank according to a preferred embodiment of the present invention.

FIG. 4 illustrates a circuit diagram depicting a mobile power bank according to a preferred embodiment of the present invention. Referring to FIG. 3 and FIG. 4, the difference between the circuit in FIG. 4 and the circuit in FIG. 3 is that the unidirectional conductive element 401 is coupled between the upper switch M1 of the first half bridge converter 301 and the battery 201. FIG. 5 illustrates a circuit diagram depicting a mobile power bank according to a preferred embodiment of the present invention. Referring to FIG. 3 and FIG. 5, the difference between the circuit in FIG. 5 and the circuit in FIG. 3 is that the unidirectional conductive element 501 is coupled between the upper switch M1 of the first half bridge converter 301 and the upper switch M3 of the second half bridge converter 302. The unidirectional conductive element 501 would block the output voltage Vo outputted from the boost DC to DC converter 204 to feed back to the battery 201.

Figure 6:
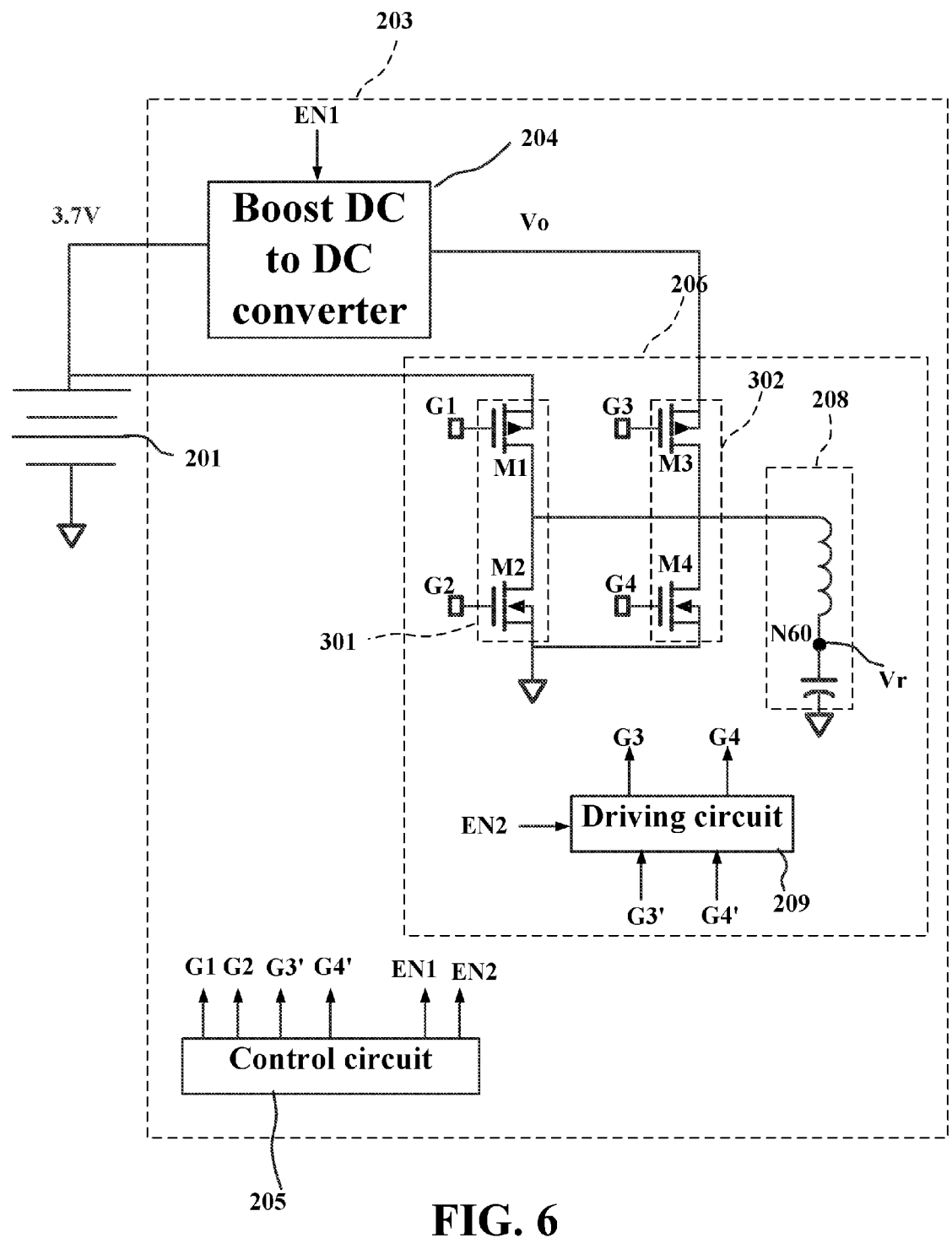
FIG. 6 illustrates a circuit diagram depicting a mobile power bank according to a preferred embodiment of the present invention.

FIG. 6 illustrates a circuit diagram depicting a mobile power bank according to a preferred embodiment of the present invention. Referring to FIG. 3 and FIG. 6, the difference between the circuit in FIG. 6 and the circuit in FIG. 3 is that the control circuit 205 samples the voltage of the node N60 coupled to the resonant coil L21 and the resonant capacitor C21 instead of the voltage Vsense of the current sensing resistor R21.

Figure 7:
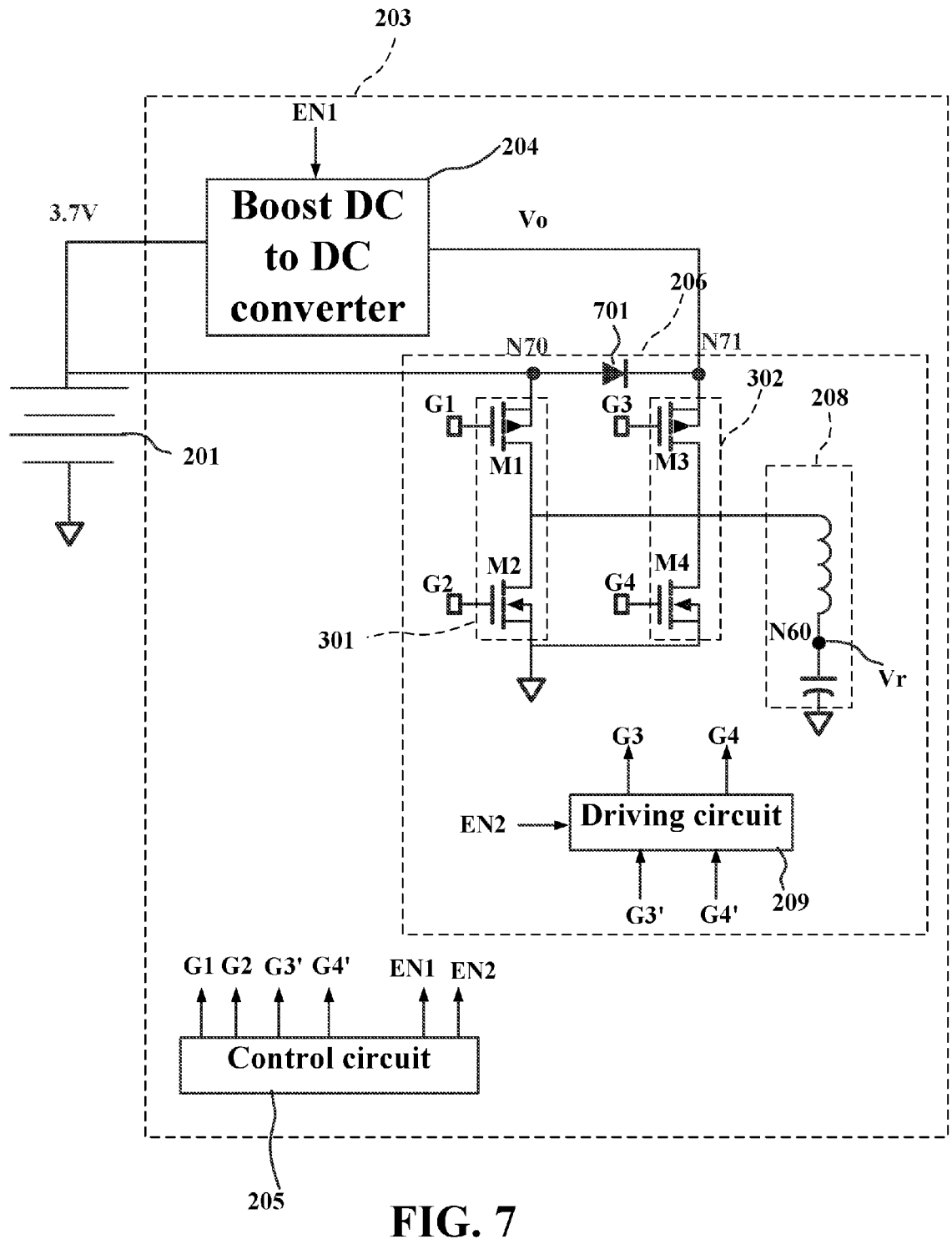
FIG. 7 illustrates a circuit diagram depicting a mobile power bank according to a preferred embodiment of the present invention.

FIG. 7 illustrates a circuit diagram depicting a mobile power bank according to a preferred embodiment of the present invention. Referring to FIG. 6 and FIG. 7, the difference between the circuit in FIG. 7 and the circuit in FIG. 6 is that the unidirectional conductive element 701 is coupled between the node N70 and the node N71. Since the current of the unidirectional conductive element 701 only can flow from the battery 201 to the second half bridge 302, the output voltage Vo of the boost DC to DC converter 204 would not affect the battery 201.

Figure 8:
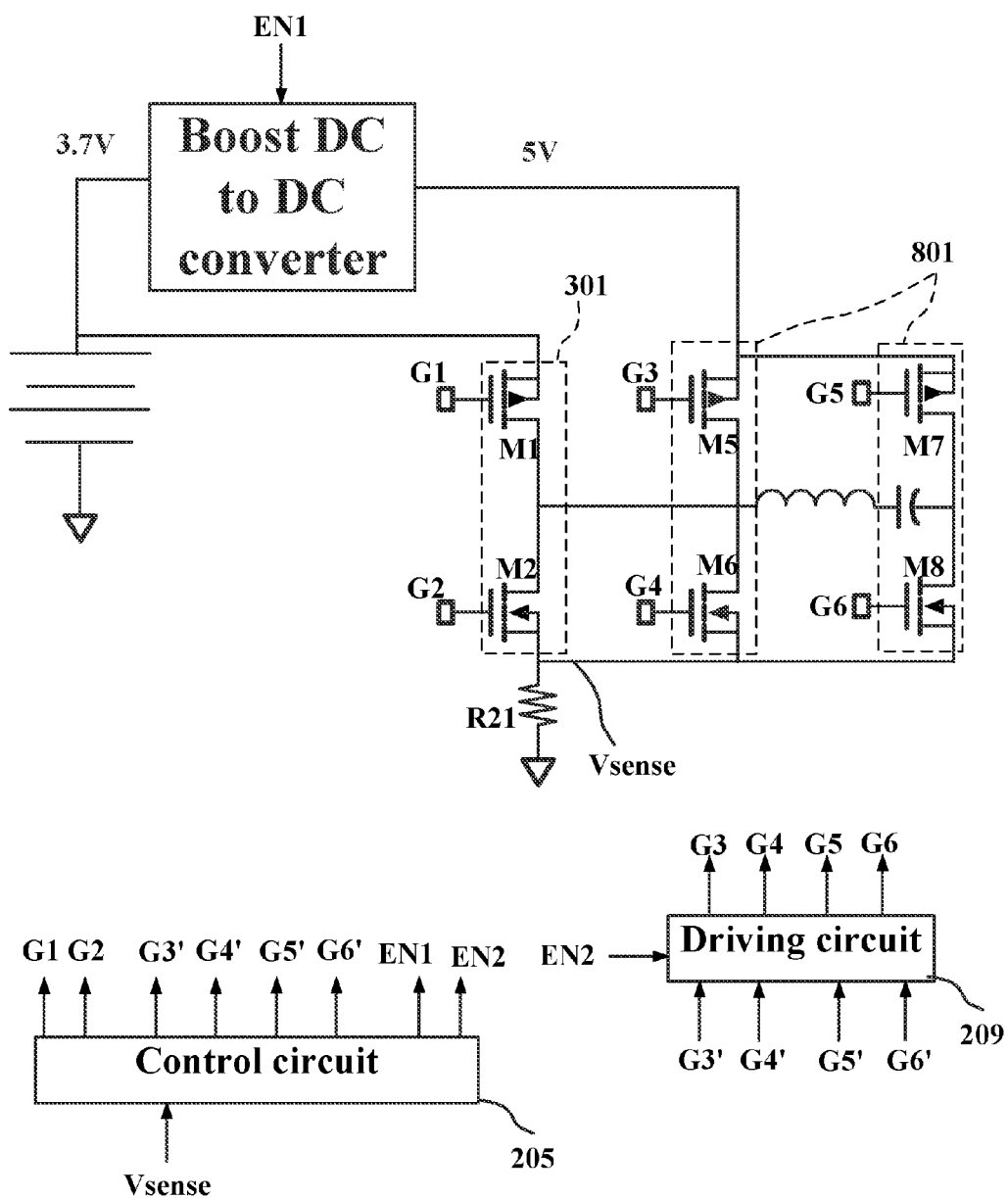
FIG. 8 illustrates a circuit diagram depicting a mobile power bank according to a preferred embodiment of the present invention.

FIG. 8 illustrates a circuit diagram depicting a mobile power bank according to a preferred embodiment of the present invention. Referring to FIG. 3 and FIG. 8, the difference between the circuit in FIG. 8 and the circuit in FIG. 3 is that the second half bridge converter 302 is replaced by the full bridge converter 801. The full bridge converter 801 includes a first upper switch M5, a first lower switch M6, a second upper switch M7 and a second lower switch M8. Thus, the control circuit 205 must output six gate control signals G1, G2, G3'~G6'. And the driving circuit 209 must output four gate control signals G3~G6 to respectively drive the first upper switch M5, the first lower switch M6, the second upper switch M7 and the second lower switch M8. The operation concept of the circuit in FIG. 8 is essentially the same as the operation concept of the circuit in FIG. 3. The detail description is omitted.

Figure 9:
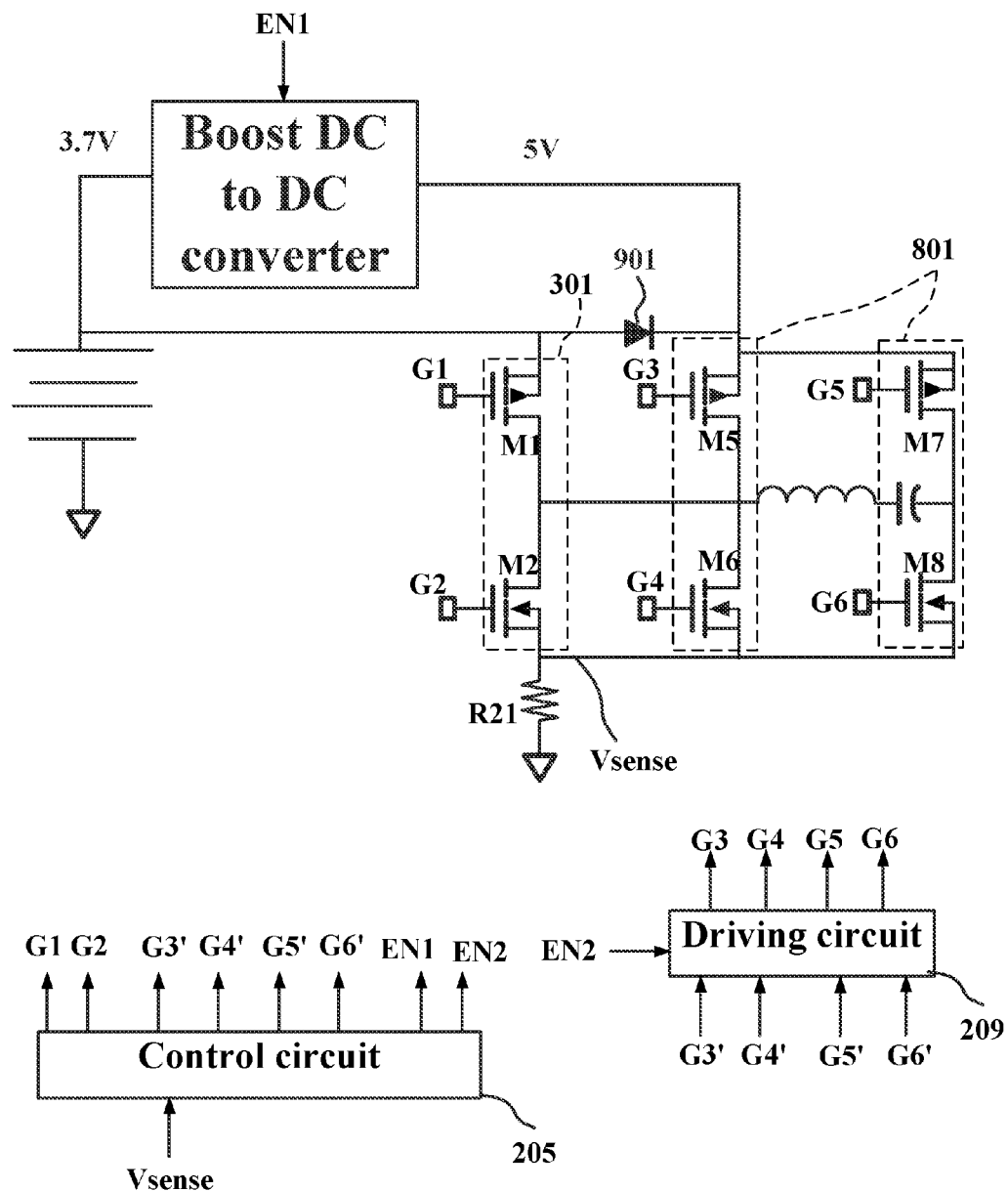
FIG. 9 illustrates a circuit diagram depicting a mobile power bank according to a preferred embodiment of the present invention.

FIG. 9 illustrates a circuit diagram depicting a mobile power bank according to a preferred embodiment of the present invention. Referring to FIG. 8 and FIG. 9, the difference between the circuit in FIG. 9 and the circuit in FIG. 8 is that the circuit in FIG. 9 has extra unidirectional conductive element 901. Since the current of the unidirectional conductive element 901 only can flow from the battery 201 to the full bridge converter 801, the output voltage Vo of the boost DC to DC converter 204 would not affect the battery 201.

Figure 10:
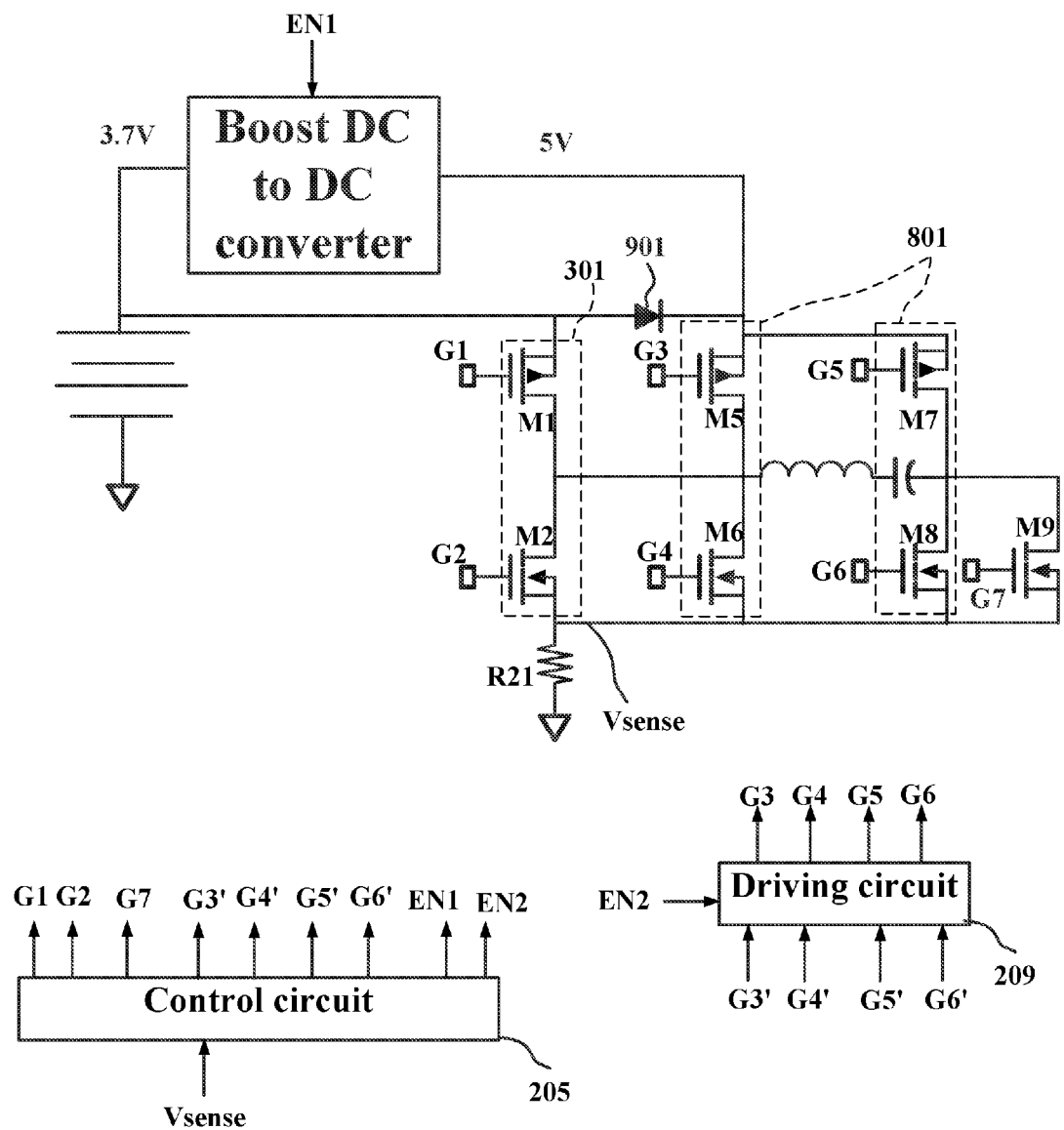
FIG. 10 illustrates a circuit diagram depicting a mobile power bank according to a preferred embodiment of the present invention.

FIG. 10 illustrates a circuit diagram depicting a mobile power bank according to a preferred embodiment of the present invention. Referring to FIG. 8 and FIG. 10, the difference between the circuit in FIG. 9 and the circuit in FIG. 8 is that the circuit in FIG. 10 has an extra switch M9. And the control circuit also has an extra control terminal G7 coupled to the gate of the switch M9. Similarly, when the wireless charging circuit 203 in this embodiment begins to detect the wireless power receiver (or an external object), the boost DC to DC converter 204 and the driving circuit 209 are disabled. Instead, the control circuit 205 output the control signals G1 and G2 to control the gates of the switch M1 and M2 of the first half bridge converter 301 to output the low voltage PWM signal, whose amplitude is about 3.7V, to the resonant circuit 208. Meanwhile, the control circuit 205 controls the gate G7 of the switch M9 to turn switch M9 on such that the resonant circuit 208 is grounded.

Next, the control circuit then starts to detect the current flowing through the resonant circuit 208. Generally, the control circuit 205 would detect the voltage Vsense from the current sensing resistor R21 to serve as the means for detecting the current of the resonant circuit 208. When the current flowing through the current sensing resistor R21 is increased, it represent that there is an object being disposed on the resonant coil L21. At this time, the control circuit 205 enables the boost DC to DC converter 204. Meanwhile, the control circuit 205 controls the gate G7 of the switch M9 to turn the switch M9 off. Further, the control circuit 205 then controls the driving circuit 209 to drive the four switch M5, M6, M7 and M8 of the full bridge converter 801 to output a high voltage PWM signal to the resonant circuit to attempt establishing the connection with the object, wherein the amplitude of the high voltage PWM signal is about 5V.

Moreover, in order to prevent the 5V outputted from the boost DC to DC converter 204 returning to the battery 201, in the abovementioned embodiment, there is no electrical connection between the output terminal of the boost DC to DC converter 204 and the first half bridge converter 301. Thus, the 5V outputted from the boost DC to DC converter 204 would not feed back to the battery 201. In the abovementioned embodiment, since the amplitude of the control signal outputted from the control circuit 205 is about 3.7V, the control signals are insufficient to drive the switches M5, M6, M7 and M8 of the full bridge converter 801. Thus, the driving circuit 209 is with a function of level shift for converting the 3.7V amplitude of the driving signal to the 5V amplitude of the driving signal.

Figure 11:
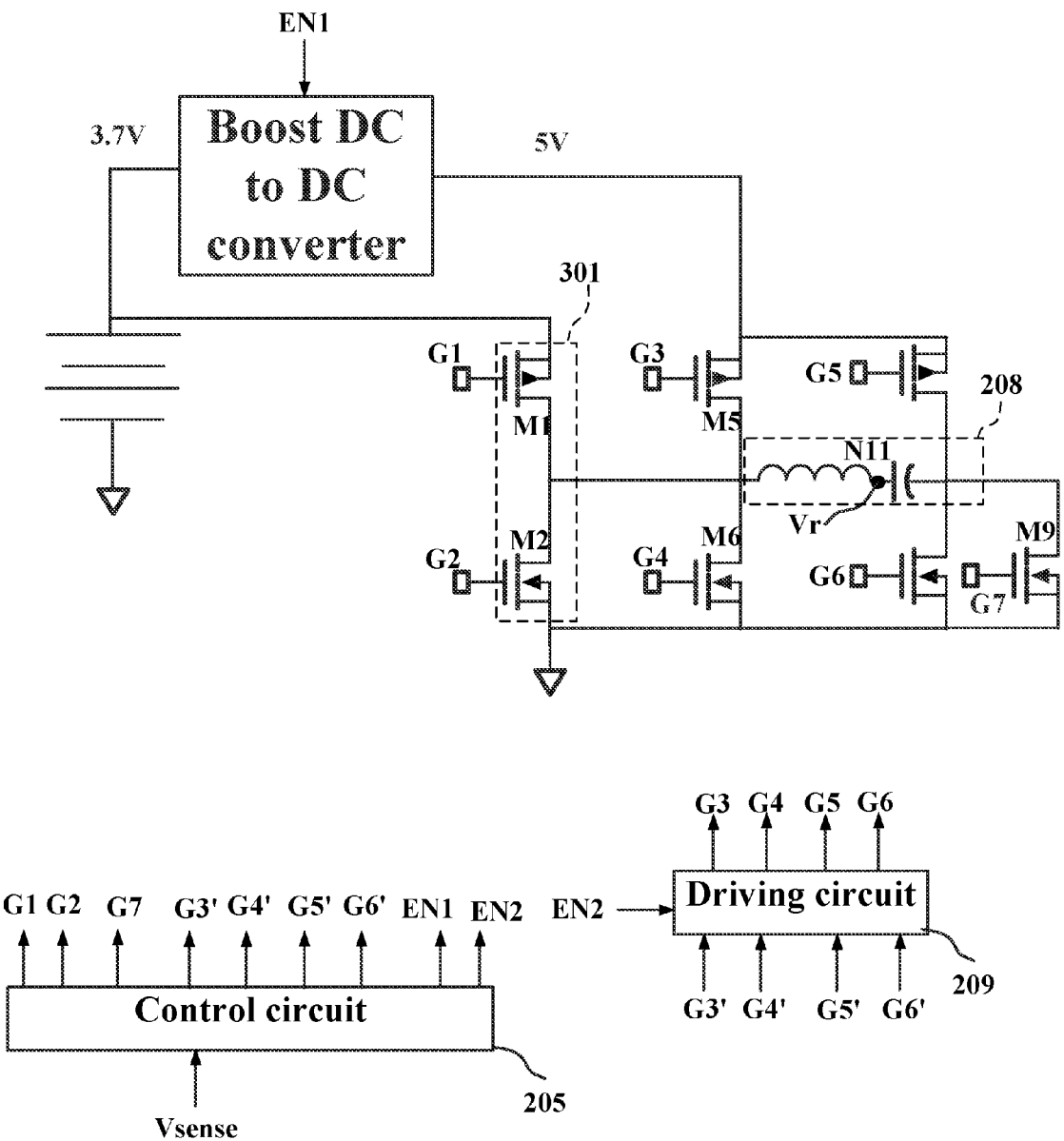
FIG. 11 illustrates a circuit diagram depicting a mobile power bank according to a preferred embodiment of the present invention.

FIG. 11 illustrates a circuit diagram depicting a mobile power bank according to a preferred embodiment of the present invention. Referring to FIG. 10 and FIG. 11, the difference between the circuit in FIG. 11 and the circuit in FIG. 10 is that the resistor R21 is removed. The control circuit 205 samples the voltage Vr of the node N11 of the resonant circuit 208 to serve as the means for detecting the current of the resonant circuit 208. The node voltage Vr of the node N11 is proportional to the current flowing through the resonant circuit 208. Thus, the control circuit 205 can obtain the current flowing through the resonant circuit 208 by detecting the voltage Vr of the node N11.

Figure 12A:
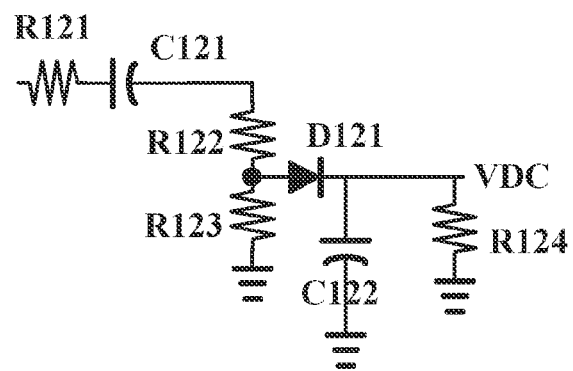
FIG. 12A illustrates a circuit diagram depicting a current detection circuit according to a preferred embodiment of the present invention.
Figure 12B:
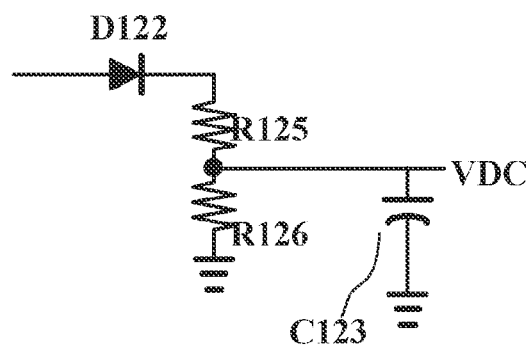
FIG. 12B illustrates a circuit diagram depicting a current detection circuit according to a preferred embodiment of the present invention.
Figure 12C:
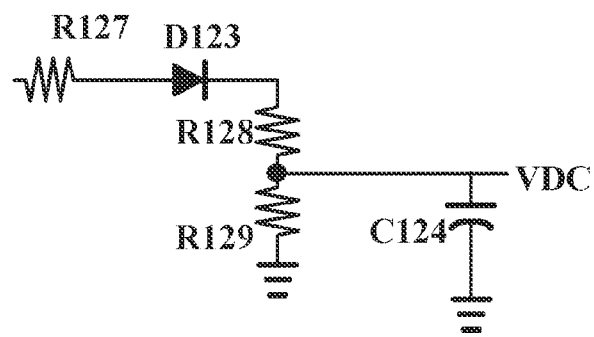
FIG. 12C illustrates a circuit diagram depicting a current detection circuit according to a preferred embodiment of the present invention.

FIG. 12A illustrates a circuit diagram depicting a current detection circuit according to a preferred embodiment of the present invention. FIG. 12B illustrates a circuit diagram depicting a current detection circuit according to a preferred embodiment of the present invention. FIG. 12C illustrates a circuit diagram depicting a current detection circuit according to a preferred embodiment of the present invention. Referring to FIG. 12A, the current detection circuit can be coupled between the control circuit 205 and the node N11 of the resonant circuit 208 in FIG. 11 or be coupled between the control circuit 205 and the node N60 in FIG. 6. The current detection circuit may also be coupled between the current sensing resistor R21 and the control circuit 205. Assuming the current detection circuit is applied to the circuit in FIG. 11, the resistor R121 is coupled between the node N11 of the resonant circuit and the capacitor C121. The resistors R122 and R123 are used for dividing the voltage of another terminal of the capacitor C121. Afterward, the divided voltage is sampled by the quasi-peak detector implemented by the diode D121, the capacitor C122 and the resistor R124. The control circuit 205 detects the DC voltage VDC to determine the magnitude of the current flowing through the resonant circuit 208.

Similarly, referring to FIG. 12B, assuming the current detection circuit is applied to the circuit in FIG. 11, the diode D122 is coupled between the node N11 of the resonant circuit 208 and the resistor R125. The resistors R125 and R126 are used for dividing the voltage of the cathode D122 and then outputting the divided voltage to the capacitor C123. The control circuit 205 detects the DC voltage VDC to determine the magnitude of the current flowing through the resonant circuit 208. Analogously, referring to FIG. 12C, assuming the current detection circuit is applied to the circuit in FIG. 11, the resistor R127 is coupled between the node N11 of the resonant circuit 208 and the diode D123. The resistors R128 and R129 are used for dividing the voltage of the cathode of the diode D123 to output the divided voltage to the capacitor C124. The control circuit 205 detects the DC voltage VDC to determine the magnitude of the current flowing through the resonant circuit 208.

In summary, the spirit of the present invention is to disable the DC to DC converter while the wireless charging circuit determines whether an external object is disposed on the wireless power converter or not. Instead, when the wireless charging circuit determines whether an external object is disposed on the wireless power converter or not, the battery voltage is supplied to the wireless charging circuit without conversion to perform the detection of external object. When the wireless charging circuit determines that an external object is disposed on the wireless power converter, the wireless power converter enables the boost DC to DC converter. Thus, when the detection of an external object is performed, there is no extra power consumption from the DC to DC converter. Meanwhile, the power consumption of the detection of an external wireless power receiver can be also reduced.

While the invention has been described by way of examples and in terms of preferred embodiments, it is to be understood that the invention is not limited thereto. To the contrary, it is intended to cover various modifications. Therefore, the scope of the appended claims should be accorded the broadest interpretation so as to encompass all such modifications.

What is claimed is:

1. A wireless charging circuit, adapted for a power bank, wherein the power bank comprises a battery, wherein the wireless charging circuit comprises:
   a boost DC to DC converter, comprising an input terminal and an output terminal, wherein the input terminal of the boost DC to DC converter is coupled to the battery to receive a battery voltage, wherein the output terminal of the boost DC to DC converter is for outputting a converted DC voltage;
   a unidirectional conductive element, comprising a first terminal and a second terminal, wherein the first terminal of the unidirectional conductive element is coupled to the battery to receive the battery voltage, wherein a current direction is from the first terminal of the unidirectional conductive element to the second terminal of the unidirectional conductive element; and
   a wireless power converter, coupled to the second terminal of the unidirectional conductive element and the output terminal of the boost DC to DC converter,
   wherein the wireless power converter disables the boost DC to DC converter when the wireless charging circuit determines whether an external object is disposed on the wireless power converter or not,
   wherein the wireless power converter enables the boost DC to DC converter when the wireless charging circuit determines that an external object is disposed on the wireless power converter.

2. The wireless charging circuit according to claim 1, wherein the boost DC to DC converter comprises an enable terminal, and the wireless power converter comprises:
   a low voltage pulse width modulation (PWM) circuit, comprising an input terminal and an output terminal, wherein the input terminal of the low voltage PWM circuit is coupled to the second terminal of the unidirectional conductive element, and the output terminal of the low voltage PWM circuit outputs a PWM detecting signal;
   a resonant circuit, comprising a first input terminal, wherein the first input terminal is coupled to the output terminal of the low voltage PWM circuit; and
   a control circuit, coupled to the enable terminal of the boost DC to DC converter;
   wherein, the control circuit controls the boost DC to DC converter to disable the boost DC to DC converter when the wireless charging circuit determines whether an external object is disposed on the wireless power converter or not.

3. The wireless charging circuit according to claim 2, wherein the resonant circuit further comprises a second input terminal, and the resonant circuit comprises:
   a resonant coil, comprising a first terminal and a second terminal, wherein the first terminal of the resonant coil is coupled to the first input terminal of the resonant circuit; and
   a resonant capacitor, comprising a first terminal and a second terminal, wherein the first terminal of the resonant capacitor is coupled to the second terminal of the resonant coil, and the second terminal of the resonant capacitor is coupled to the second input terminal of the resonant circuit.

4. The wireless charging circuit according to claim 2, wherein the resonant circuit further comprises a second input terminal, and the resonant circuit comprises:
   a resonant capacitor, comprising a first terminal and a second terminal, wherein the first terminal of the resonant capacitor is coupled to the first input terminal of the resonant circuit; and
   a resonant coil, comprising a first terminal and a second terminal, wherein the first terminal of the resonant coil is coupled to the second terminal of the resonant capacitor, and the second terminal of the resonant coil is coupled to the second input terminal of the resonant circuit.

5. The wireless charging circuit according to claim 2, wherein the low power PWM circuit comprises:
- a first upper switch, comprising a first terminal, a second terminal and a control terminal, wherein the control terminal of the first upper switch is coupled to the control circuit, and the first terminal of the first upper switch is coupled to the second terminal of the unidirectional conductive element; and
- a first lower switch, comprising a first terminal, a second terminal and a control terminal, wherein the control terminal of the first lower switch is coupled to the control circuit, the first terminal of the first lower switch is coupled to the second terminal of the first upper switch and the first input terminal of the resonant circuit, and the second terminal of the first lower switch is coupled to a common voltage.

6. The wireless charging circuit according to claim 2, further comprising:
- a high voltage pulse width modulation (PWM) circuit, coupled to the output terminal of the boost DC to DC converter for outputting a driving PWM signal to the resonant circuit; and
- a driving circuit, coupled to the high voltage pulse width modulation circuit, the boost DC to DC converter and the control circuit,
- wherein the control circuit enables the boost DC to DC converter and the control circuit enables the driving circuit to drive the high voltage PWM circuit when the wireless charging circuit determines that an external object is disposed on the wireless power converter.

7. The wireless charging circuit according to claim 6, wherein the high voltage PWM circuit comprises:
- a second upper switch, comprising a first terminal, a second terminal and a control terminal, wherein the control terminal of the second upper switch is coupled to the driving circuit, and the first terminal of the second upper switch is coupled to the output terminal of the boost DC to DC converter; and
- a second lower switch, comprising a first terminal, a second terminal and a control terminal, wherein the control terminal of the second lower switch is coupled to the driving circuit, the first terminal of the second lower switch is coupled to the second terminal of the second upper switch and the first input terminal of the resonant circuit, and the second terminal of the second lower switch is coupled to a common voltage.

8. The wireless charging circuit according to claim 7, wherein the resonant circuit further comprises a second input terminal, and high voltage PWM circuit further comprises:
- a third upper switch, comprising a first terminal, a second terminal and a control terminal, wherein the control terminal of the third upper switch is coupled to the driving circuit, and the first terminal of the third upper switch is coupled to the output terminal of the boost DC to DC converter; and
- a third lower switch, comprising a first terminal, a second terminal and a control terminal, wherein the control terminal of the third lower switch is coupled to the driving circuit, the first terminal of the third lower switch is coupled to the second terminal of the third upper switch and the second input terminal of the resonant circuit, and the second terminal of the third lower switch is coupled to the common voltage.

9. The wireless charging circuit according to claim 8, further comprising:
- a detection switch, comprising a first terminal, a second terminal and a control terminal, wherein the control terminal of the detection switch is coupled to the control circuit, the first terminal of the detection switch is coupled to the second input terminal of the resonant circuit, and the second terminal of the detection switch is coupled to the common voltage,
- wherein the control circuit controls the detection switch to connect the first terminal of the detection switch with the second terminal of the detection switch when the wireless charging circuit determines whether an external object is disposed on the wireless power converter or not.

10. A mobile power bank, comprising:
- a battery; and
- a wireless charging circuit, comprising:
  - a boost DC to DC converter, comprising an input terminal and an output terminal, wherein the input terminal of the boost DC to DC converter is coupled to the battery to receive a battery voltage, wherein the output terminal of the boost DC to DC converter is for outputting a converted DC voltage;
  - a unidirectional conductive element, comprising a first terminal and a second terminal, wherein the first terminal of the unidirectional conductive element is coupled to the battery to receive the battery voltage, wherein a current direction is from the first terminal of the unidirectional conductive element to the second terminal of the unidirectional conductive element; and
  - a wireless power converter, coupled to the second terminal of the unidirectional conductive element and the output terminal of the boost DC to DC converter,
  - wherein the wireless power converter disables the boost DC to DC converter when the wireless charging circuit determines whether an external object is disposed on the wireless power converter or not,
  - wherein the wireless power converter enables the boost DC to DC converter when the wireless charging circuit determines that an external object is disposed on the wireless power converter.

11. The mobile power bank according to claim 10, wherein the boost DC to DC converter comprises an enable terminal, and the wireless power converter comprises:
- a low voltage pulse width modulation (PWM) circuit, comprising an input terminal and an output terminal, wherein the input terminal of the low voltage PWM circuit is coupled to the second terminal of the unidirectional conductive element, and the output terminal of the low voltage PWM circuit outputs a PWM detecting signal;
- a resonant circuit, comprising a first input terminal, wherein the first input terminal is coupled to the output terminal of the low voltage PWM circuit; and
- a control circuit, coupled to the enable terminal of the boost DC to DC converter;
- wherein, the control circuit controls the boost DC to DC converter to disable the boost DC to DC converter when the wireless charging circuit determines whether an external object is disposed on the wireless power converter or not.

12. The mobile power bank according to claim 11, wherein the resonant circuit further comprises a second input terminal, and the resonant circuit comprises:

a resonant coil, comprising a first terminal and a second terminal, wherein the first terminal of the resonant coil is coupled to the first input terminal of the resonant circuit; and a resonant capacitor, comprising a first terminal and a second terminal, wherein the first terminal of the resonant capacitor is coupled to the second terminal of the resonant coil, and the second terminal of the resonant capacitor is coupled to the second input terminal of the resonant circuit.

13. The mobile power bank according to claim 11, wherein the resonant circuit further comprises a second input terminal, and the resonant circuit comprises:

a resonant capacitor, comprising a first terminal and a second terminal, wherein the first terminal of the resonant capacitor is coupled to the first input terminal of the resonant circuit; and a resonant coil, comprising a first terminal and a second terminal, wherein the first terminal of the resonant coil is coupled to the second terminal of the resonant capacitor, and the second terminal of the resonant coil is coupled to the second input terminal of the resonant circuit.

14. The mobile power bank according to claim 11, wherein the low power PWM circuit comprises:

a first upper switch, comprising a first terminal, a second terminal and a control terminal, wherein the control terminal of the first upper switch is coupled to the control circuit, and the first terminal of the first upper switch is coupled to the second terminal of the unidirectional conductive element; and a first lower switch, comprising a first terminal, a second terminal and a control terminal, wherein the control terminal of the first lower switch is coupled to the control circuit, the first terminal of the first lower switch is coupled to the second terminal of the first upper switch and the first input terminal of the resonant circuit, and the second terminal of the first lower switch is coupled to a common voltage.

15. The mobile power bank according to claim 11, further comprising:

a high voltage pulse width modulation (PWM) circuit, coupled to the output terminal of the boost DC to DC converter for outputting a driving PWM signal to the resonant circuit; and a driving circuit, coupled to the high voltage pulse width modulation circuit, the boost DC to DC converter and the control circuit, wherein the control circuit enables the boost DC to DC converter and the control circuit enables the driving circuit to drive the high voltage PWM circuit when the wireless charging circuit determines that an external object is disposed on the wireless power converter.

16. The mobile power bank according to claim 15, wherein the high voltage PWM circuit comprises:

a second upper switch, comprising a first terminal, a second terminal and a control terminal, wherein the control terminal of the second upper switch is coupled to the driving circuit, and the first terminal of the second upper switch is coupled to the output terminal of the boost DC to DC converter; and a second lower switch, comprising a first terminal, a second terminal and a control terminal, wherein the control terminal of the second lower switch is coupled to the driving circuit, the first terminal of the second lower switch is coupled to the second terminal of the second upper switch and the first input terminal of the resonant circuit, and the second terminal of the second lower switch is coupled to a common voltage.

17. The mobile power bank according to claim 16, wherein the resonant circuit further comprises a second input terminal, and high voltage PWM circuit further comprises:

a third upper switch, comprising a first terminal, a second terminal and a control terminal, wherein the control terminal of the third upper switch is coupled to the driving circuit, and the first terminal of the third upper switch is coupled to the output terminal of the boost DC to DC converter; and a third lower switch, comprising a first terminal, a second terminal and a control terminal, wherein the control terminal of the third lower switch is coupled to the driving circuit, the first terminal of the third lower switch is coupled to the second terminal of the third upper switch and the second input terminal of the resonant circuit, and the second terminal of the third lower switch is coupled to the common voltage.

18. The mobile power bank according to claim 17, further comprising:

a detection switch, comprising a first terminal, a second terminal and a control terminal, wherein the control terminal of the detection switch is coupled to the control circuit, the first terminal of the detection switch is coupled to the second input terminal of the resonant circuit, and the second terminal of the detection switch is coupled to the common voltage, wherein the control circuit controls the detection switch to connect the first terminal of the detection switch with the second terminal of the detection switch when the wireless charging circuit determines whether an external object is disposed on the wireless power converter or not.

19. A wireless charging circuit, adapted for a power bank, wherein the power bank comprises a battery, wherein the wireless charging circuit comprises:

a boost DC to DC converter, comprising an input terminal and an output terminal, wherein the input terminal of the boost DC to DC converter is coupled to the battery to receive a battery voltage, wherein the output terminal of the boost DC to DC converter is for outputting a converted DC voltage;

a control circuit, coupled to the battery to receive the battery voltage;

a low voltage pulse width modulation (PWM) circuit, coupled to the control circuit and the battery to receive the battery voltage, for outputting a low voltage PWM signal according to the control of the control circuit;

a wireless power converter, comprising;

a high voltage PWM circuit, coupled to the control circuit and the output terminal of the boost DC to DC converter, for outputting a high voltage PWM signal according to the control of the control circuit; and a resonant circuit, comprising a first input terminal, wherein the first input terminal of the resonant circuit is coupled to the low voltage PWM circuit and a high voltage PWM circuit;

wherein the wireless power converter disables the boost DC to DC converter and the high voltage PWM circuit and the wireless power converter controls the low voltage PWM circuit to output the low voltage PWM signal to the resonant circuit when the wireless charging circuit determines whether an external object is disposed on the wireless power converter or not, wherein the wireless power converter enables the boost DC to DC converter and the high voltage PWM circuit and the wireless power converter disables the low voltage PWM circuit when the wireless charging circuit determines that an external object is disposed on the wireless power converter.

20. The wireless charging circuit according to claim 19, wherein the resonant circuit further comprises a second input terminal, and the resonant circuit comprises:
   a resonant coil, comprising a first terminal and a second terminal, wherein the first terminal of the resonant coil is coupled to the first input terminal of the resonant circuit; and
   a resonant capacitor, comprising a first terminal and a second terminal, wherein the first terminal of the resonant capacitor is coupled to the second terminal of the resonant coil, and the second terminal of the resonant capacitor is coupled to the second input terminal of the resonant circuit.

21. The wireless charging circuit according to claim 19, wherein the resonant circuit further comprises a second input terminal, and the resonant circuit comprises:
   a resonant capacitor, comprising a first terminal and a second terminal, wherein the first terminal of the resonant capacitor is coupled to the first input terminal of the resonant circuit; and
   a resonant coil, comprising a first terminal and a second terminal, wherein the first terminal of the resonant coil is coupled to the second terminal of the resonant capacitor, and the second terminal of the resonant coil is coupled to the second input terminal of the resonant circuit.

22. The wireless charging circuit according to claim 19, wherein the low power PWM circuit comprises:
   a first upper switch, comprising a first terminal, a second terminal and a control terminal, wherein the control terminal of the first upper switch is coupled to the control circuit, and the first terminal of the first upper switch is coupled to the battery to receive the battery voltage; and
   a first lower switch, comprising a first terminal, a second terminal and a control terminal, wherein the control terminal of the first lower switch is coupled to the control circuit, the first terminal of the first lower switch is coupled to the second terminal of the first upper switch and the first input terminal of the resonant circuit, and the second terminal of the first lower switch is coupled to a common voltage.

23. The wireless charging circuit according to claim 19, further comprising:
   a driving circuit, coupled to the high voltage pulse width modulation circuit, the boost DC to DC converter and the control circuit,
   wherein the control circuit enables the boost DC to DC converter and the control circuit enables the driving circuit to drive the high voltage PWM circuit when the wireless charging circuit determines that an external object is disposed on the wireless power converter.

24. The wireless charging circuit according to claim 23, wherein the high voltage PWM circuit comprises:
   a second upper switch, comprising a first terminal, a second terminal and a control terminal, wherein the control terminal of the second upper switch is coupled to the driving circuit, and the first terminal of the second upper switch is coupled to the output terminal of the boost DC to DC converter; and
   a second lower switch, comprising a first terminal, a second terminal and a control terminal, wherein the control terminal of the second lower switch is coupled to the driving circuit, the first terminal of the second lower switch is coupled to the second terminal of the second upper switch and the first input terminal of the resonant circuit, and the second terminal of the second lower switch is coupled to a common voltage.

25. The wireless charging circuit according to claim 24, wherein the resonant circuit further comprises a second input terminal, and the high voltage PWM circuit further comprises:
   a third upper switch, comprising a first terminal, a second terminal and a control terminal, wherein the control terminal of the third upper switch is coupled to the driving circuit, and the first terminal of the third upper switch is coupled to the output terminal of the boost DC to DC converter; and
   a third lower switch, comprising a first terminal, a second terminal and a control terminal, wherein the control terminal of the third lower switch is coupled to the driving circuit, the first terminal of the third lower switch is coupled to the second terminal of the third upper switch and the second input terminal of the resonant circuit, and the second terminal of the third lower switch is coupled to the common voltage.

26. The wireless charging circuit according to claim 25, further comprising:
   a detection switch, comprising a first terminal, a second terminal and a control terminal, wherein the control terminal of the detection switch is coupled to the control circuit, the first terminal of the detection switch is coupled to the second input terminal of the resonant circuit, and the second terminal of the detection switch is coupled to the common voltage,
   wherein the control circuit controls the detection switch to connect the first terminal of the detection switch with the second terminal of the detection switch when the wireless charging circuit determines whether an external object is disposed on the wireless power converter or not.

27. A mobile power bank, comprising:
   a battery; and
   a wireless charging circuit, comprising:
      a boost DC to DC converter, comprising an input terminal and an output terminal, wherein the input terminal of the boost DC to DC converter is coupled to the battery to receive a battery voltage, wherein the output terminal of the boost DC to DC converter is for outputting a converted DC voltage;
      a control circuit, coupled to the battery to receive the battery voltage;
      a low voltage pulse width modulation (PWM) circuit, coupled to the control circuit and the battery to receive the battery voltage, for outputting a low voltage PWM signal according to the control of the control circuit;
      a wireless power converter, comprising;
         a high voltage PWM circuit, coupled to the control circuit and the output terminal of the boost DC to DC converter, for outputting a high voltage PWM signal according to the control of the control circuit; and
         a resonant circuit, comprising a first input terminal, wherein the first input terminal of the resonant circuit is coupled to the low voltage PWM circuit and a high voltage PWM circuit;

wherein the wireless power converter disables the boost DC to DC converter and the high voltage PWM circuit and the wireless power converter controls the low voltage PWM circuit to output the low voltage PWM signal to the resonant circuit when the wireless charging circuit determines whether an external object is disposed on the wireless power converter or not, wherein the wireless power converter enables the boost DC to DC converter and the high voltage PWM circuit and the wireless power converter disables the low voltage PWM circuit when the wireless charging circuit determines that an external object is disposed on the wireless power converter.

28. The mobile power bank according to claim 27, wherein the resonant circuit further comprises a second input terminal, and the resonant circuit comprises:
   a resonant coil, comprising a first terminal and a second terminal, wherein the first terminal of the resonant coil is coupled to the first input terminal of the resonant circuit; and
   a resonant capacitor, comprising a first terminal and a second terminal, wherein the first terminal of the resonant capacitor is coupled to the second terminal of the resonant coil, and the second terminal of the resonant capacitor is coupled to the second input terminal of the resonant circuit.

29. The mobile power bank according to claim 27, wherein the resonant circuit further comprises a second input terminal, and the resonant circuit comprises:
   a resonant capacitor, comprising a first terminal and a second terminal, wherein the first terminal of the resonant capacitor is coupled to the first input terminal of the resonant circuit; and
   a resonant coil, comprising a first terminal and a second terminal, wherein the first terminal of the resonant coil is coupled to the second terminal of the resonant capacitor, and the second terminal of the resonant coil is coupled to the second input terminal of the resonant circuit.

30. The mobile power bank according to claim 27, wherein the low power PWM circuit comprises:
   a first upper switch, comprising a first terminal, a second terminal and a control terminal, wherein the control terminal of the first upper switch is coupled to the control circuit, and the first terminal of the first upper switch is coupled to the battery to receive the battery voltage; and
   a first lower switch, comprising a first terminal, a second terminal and a control terminal, wherein the control terminal of the first lower switch is coupled to the control circuit, the first terminal of the first lower switch is coupled to the second terminal of the first upper switch and the first input terminal of the resonant circuit, and the second terminal of the first lower switch is coupled to a common voltage.

31. The mobile power bank according to claim 27, further comprising:
   a driving circuit, coupled to the high voltage pulse width modulation circuit, the boost DC to DC converter and the control circuit,
   wherein the control circuit enables the boost DC to DC converter and the control circuit enables the driving circuit to drive the high voltage PWM circuit when the wireless charging circuit determines that an external object is disposed on the wireless power converter.

32. The mobile power bank according to claim 31, wherein the high voltage PWM circuit comprises:
   a second upper switch, comprising a first terminal, a second terminal and a control terminal, wherein the control terminal of the second upper switch is coupled to the driving circuit, and the first terminal of the second upper switch is coupled to the output terminal of the boost DC to DC converter; and
   a second lower switch, comprising a first terminal, a second terminal and a control terminal, wherein the control terminal of the second lower switch is coupled to the driving circuit, the first terminal of the second lower switch is coupled to the second terminal of the second upper switch and the first input terminal of the resonant circuit, and the second terminal of the second lower switch is coupled to a common voltage.

33. The mobile power bank according to claim 32, wherein the resonant circuit further comprises a second input terminal, and high voltage PWM circuit further comprises:
   a third upper switch, comprising a first terminal, a second terminal and a control terminal, wherein the control terminal of the third upper switch is coupled to the driving circuit, and the first terminal of the third upper switch is coupled to the output terminal of the boost DC to DC converter; and
   a third lower switch, comprising a first terminal, a second terminal and a control terminal, wherein the control terminal of the third lower switch is coupled to the driving circuit, the first terminal of the third lower switch is coupled to the second terminal of the third upper switch and the second input terminal of the resonant circuit, and the second terminal of the third lower switch is coupled to the common voltage.

34. The mobile power bank according to claim 33, further comprising:
   a detection switch, comprising a first terminal, a second terminal and a control terminal, wherein the control terminal of the detection switch is coupled to the control circuit, the first terminal of the detection switch is coupled to the second input terminal of the resonant circuit, and the second terminal of the detection switch is coupled to the common voltage,
   wherein the control circuit controls the detection switch to connect the first terminal of the detection switch with the second terminal of the detection switch when the wireless charging circuit determines whether an external object is disposed on the wireless power converter or not.

* * * * *